UNITED STATES PATENT OFFICE 2,285,193

REACTION PRODUCT OF WATER-SOLUBLE DEGRADED PROTEINS WITH PHENOLS AND ALDEHYDES

Lloyd Emil Dimond and William Llewellyn Hicks, Chicago, Ill., assignors to Carl Marx, Chicago, Ill., a trustee No Drawing. Application January 12, 1940, Serial No. 313,560

25 Claims. (Cl. 260—7)

The present invention relates to an improved resinoid condensation product of the phenol resin type, containing within its chemical structure proteid or nitrogenous by-products derived from proteid material by far-reaching degradation thereof to a completely soluble condition prior to their condensation with the phenol and the aldehyde.

The present application is a continuation in part of applicants' earlier application Serial No. 253,622, filed January 30, 1939.

One of the objects of the invention is to produce a condensation product from a protein material by steps involving the conversion thereof into a water-soluble condition even though not combined with an alkali, followed by condensation thereof with a phenolic substance and an aldehyde.

More specifically, the invention relates to the far-reaching heat and pressure degradation of protein materials, assisted by the presence of relatively small amounts of alkaline materials, so as to produce a soluble intermediate product in a solution having a hydrogen-ion concentration on the acid side of neutrality, and the admixture therewith of a phenolic substance and an aldehyde, followed by conjoint condensation of all these materials to a water-resistant resinoid condensation product.

Proposals have already been made in the prior art to produce conjoint condensation products of proteins, phenolic substances and aldehydes, but in these processes the proteins were merely solubilized by conversion into the corresponding alkali compounds. Such mere conversion into soluble alkali compounds is foreign to the aims of the present invention, because it has been found that products derived from such alkali compounds are exceedingly lacking in the highly desirable properties of waterproofness and moisture resistance. It appears that condensation products made from the alkali compounds of proteins never completely lose their solubility, and hence products made therefrom are insufficiently water resistant for practical purposes.

In one prior art patent, for instance, a vegetable protein is treated in the cold with potassium hydroxide, sufficient of the latter being employed to yield the potassium salt or compound of the protein, such as an alkali proteinate, which is allowed to stand in the cold to produce a reaction mistakenly termed "hydrolysis," when as a matter of fact mere production of the soluble proteinate is attained. It is well known that such solutions of alkali proteinates can be substantially reconverted into the insoluble protein by mere acidulation of the proteinate solution. Condensation of the proteinates with phenol and aldehydes is stated to produce an adhesive or glue.

The present invention is therefore to be sharply contrasted with the proposals of the prior art, for in accordance with the procedures hereinbelow described, truly water-soluble protein degradation products are produced which do not depend upon the maintenance of an alkaline condition to keep the proteins in solution. These solutions may even be on the acid side of neutrality, having a pH of about 5.5. The degradation of the protein is probably effected by the conjoint action of hydrolysis and depolymerization, but in any event leads to a far-reaching modification of the protein molecule so that proteins which ordinarily are soluble in aqueous liquids only by virtue of their having formed salts with the alkalis are rendered truly water soluble without dependence upon their having combined with alkalis. The protein substances thus produced are condensed simultaneously with a phenolic body and an aldehyde in accordance with the detailed description hereinbelow.

Therefore, the ultimate object of the present invention is to produce a resinous substance, utilizing the above mentioned protein decomposition products, the condensation product being subsequently mixed with well-known fillers such as wood flour, asbestos, and the like, to yield a molding powder which may readily be molded into objects which are strong, unbreakable, non-inflammable, and moisture- and waterproof.

Previous attempts to produce a molding powder have not produced a product with sufficient moisture resistance for general molding purposes. As already mentioned, the previous art of utilizing proteins in the preparation of resinous materials and molding powders has involved the dissolving of the proteins by means of a suitable alkali, followed by mixing the thus dissolved but otherwise substantially unchanged material with phenols and aldehydes, either before or after the condensation reaction. In some cases, large amounts of alkalis (as much as 35% by weight of the protein) have been used with the proteins, and such mixtures allowed to stand to produce what the inventors thereof incorrectly termed "complete hydrolysis." However, the present applicants have found that such alleged "complete hydrolysis" under the conditions laid down in these prior art patents is not complete hydrolysis at all and also leads to production of resinous materials which, when finally cured by heat and pressure, do not possess sufficient moisture resistance to be employed for the molding of commercially useful objects. The products of the alleged hydrolysis of the materials of the prior art are essentially nothing more than alkali proteinates, with possibly small amounts of intermediate protein products such as diketopiperazines. After long, extended research work and experimentation, the present applicants have found that the methods and conditions of true protein degradation developed by them will, upon further condensation or reaction of these products with phenols and aldehydes, be productive of a resin having highly desirable properties, being particularly characterized by their high degree of moisture resistance and strength.

The type of proteins employed in accordance with the present invention comprises proteins of both vegetable and animal origin. Vegetable proteins usually contain carbohydrates. Heretofore, when, in accordance with one aspect of the invention, vegetable proteins were used, no reaction was obtained with the carbohydrate in the vegetable meal, since it was found necessary to hydrolyze these carbohydrates to secure a subsequent reaction with phenol and formaldehyde. In accordance with the present invention, it is not essential to separate the carbohydrate from the meal to attain satisfactory results. This permits the use of soybean meal, starch-free gluten and similar oilseed residue meals.

Without in any way limiting the invention or the scope of the claims, a number of examples of carrying out the invention are given herewith:

EXAMPLE I

*Resin from prolamines; corn gluten*

Corn gluten, a prolamin, as obtained as a by-product in the process of removing starch from corn, is employed as the starting material. This material as used in the present process consists of destarched gluten containing substantially 70% by weight of actual vegetable protein. This gluten is separated from the starch by the well-known gravity process, while the residual starch remaining therein is removed from the gluten by acid hydrolysis of the starch so as to form a water-soluble sugar which is subsequently removed from the residual undissolved protein by washing with water. It is this partially purified substantially starch-free gluten which is employed in the present process, being degraded by the following operations:

100 pounds of the above-mentioned gluten product (calculated on the dry basis, although wet gluten may of course be employed immediately after the starch removal) are placed in a suitable pressure vessel with the addition of sufficient water to produce a thin slurry. It has been found that a slurry containing about 20% of suspended protein solids has about the right consistency. Small amounts of alkaline reacting material such as sodium hydroxide or other equivalent alkali may be added solely for the purpose of speeding the incidental degradation. The amount of such alkali—for example, sodium hydroxide—may be as little as 2% calculated on the basis of the dry solids content of the corn gluten. It will immediately be appreciated that such a small amount of alkali is incapable of transforming the corn gluten into an alkali proteinate. The mixture containing this small amount of alkali, while contained in the pressure vessel, is then subjected to direct steam at a pressure above atmospheric, such as 80 pounds per square inch (gauge pressure) for example, with or without agitation, for a period of from 1 to 12 hours, depending partly upon whether or not alkali was used and partly upon the steam pressure employed, the higher figure being suitable for operations without the use of the alkaline catalyst or smaller amounts thereof. In general it is preferable to employ small amounts of catalyst with high steam pressure.

As a result of this heat and pressure treatment, both hydrolysis and depolymerization of the protein take place, this degradation, however, being quite different from the type which takes place when the proteins are heated with acids. In the present instance there is a liberation of polypeptides, which reduce the pH of the mixture, which originally was neutral or possibly very slightly alkaline, so that the resultant degraded mass will have an acid reaction corresponding approximately to a pH of 5.4. When about 2% of sodium hydroxide, based upon the weight of the vegetable solids, has been used it has been found that a 3-hour digestion period at about the pressure indicated is satisfactory. The resultant material at this stage is a brownish-colored liquid containing some unchanged suspended matter and debris, which can, upon removal from the pressure vessel, be filtered to remove such undissolved material. The solution will contain from 15% to 25% of total solids, and its pH is less than 7, somewhere between about 4 and 6.5 and generally around 5.5 This material in solution is in a satisfactory state for the carrying out of the condensation, as will be subsequently described, after other examples of protein degradation have been disclosed.

EXAMPLE II

*Soybean meal*

100 parts of dry soybean meal containing about 10% of moisture, 43% of protein, 4.5% of fat, and 27% of nitrogen-free extract, together with 400 parts of water, 2 parts of sodium hydroxide or equivalent alkali, and 2 parts of lime (the latter to form a calcium soap with the oil) are placed in a pressure vessel and therein subjected to 80 pounds gauge steam pressure for a period of 3 hours. The resultant material, the soluble portion of which comprises about 75% to 90% of the original meal, may be filtered if desired so as to produce a clear solution. The filtered or unfiltered solution is then ready for subsequent reaction with a phenol and an aldehyde, preferably with the use of an alkaline catalyst. During the pressure treatment the hydrogen-ion concentration of the slurry drops from an original pH of about 8.5 to a final pH of about 5.5. It will, of course, be evident that in place of using the commercial soybean meal (either oil or extracted meal) a previously prepared more or less pure vegetable protein may be employed.

EXAMPLE III

*Animal proteins*

Further advantages can be obtained by employing proteins of an animal origin, and these proteins may be such materials as albumen, blood albumen—particularly that variety known as dried fertilizer blood, and in general almost any one of the well-known scleroproteins which are albuminoids derived from skin and related structures. Good examples of such scleroproteins are collagen; keratin, such as may be derived from horn, hoofs, wool, hair, feathers, and the like; fibroin, as derived from silk; and elastin, which is the scleroprotein of animal ligaments. These materials are all available as waste products of industry and are generally quite inexpensive. Particularly good results have been obtained when starting with the scleroprotein known as keratin. It may be in the form of ground hoofs or hoof meal, or even such mixtures as contain the epidermis of animals such as hogs, leather, etc. In any case, the degradation is carried out under such conditions as to yield a completely water-soluble product. Such a product does not require either an acid or an alkali to place it into solution and when dissolved is not precipitated by changes in the hydrogen-ion concentration of the solution. In this respect, therefore, the protein degradation or cleavage products employed in connection with the present invention are to be distinguished from the merely solubilized proteins, such as the metaproteins and their alkali salts, for it is well known that the solutions of such salts can be reconverted into the proteins upon neutralization of their solutions.

As a further example of a protein suitable for carrying out the present invention, casein from either vegetable or animal sources may be mentioned.

There will now be given a specific example employing keratin. For example, 100 pounds of ground keratin material, such as hoofs, horn, hair, or feathers, are placed in a pressure vessel with 400 pounds of water and 2 pounds of sodium hydroxide or an equivalent amount of other alkali. The mixture is then subjected in the pressure vessel to the effect of 80 pounds of direct steam pressure for a period of 3 hours, during which the material is solubilized and the pH of the mixture drops to about 5.4. The solubilized keratin solution is dark brown in color and after filtration is quite clear and nonprecipitable. It is then ready for subsequent reaction with a phenol and an aldehyde, preferably in the presence of an alkaline reacting substance as a catalyst.

In all of the above examples the alkaline agent used for speeding up the production of the cleavage products may be omitted by the expedient of using higher steam pressures and/or long time. However, the presence of the small amount of alkaline material at the start is of considerable assistance in shortening the time required to produce the cleavage products. It will be noticed that, even when starting with an alkali, the final cleavage products do not have an alkaline reaction but, if anything, are slightly on the acid side. It is therefore to be understood that if desired the examples previously given may be modified to the extent of omitting therefrom the alkaline material and depending entirely upon steam pressures, temperature and time to effect the necessary splitting up and degradation of the protein to produce the desired degradation or cleavage products.

Production of resinous material from degraded protein products

The protein solutions degraded as described above are employed for the final production of the resin from a phenol or a phenolic body and an aldehyde; and, while the example immediately following is given in connection with commercial phenol and formaldehyde, it will be readily apparent that other phenolic substances and other aldehydes or aldehyde-yielding substances may be employed in lieu thereof, taking into consideration the respective molecular weights of these substances. Thus, for example, 100 parts of the degraded protein material, calculated on the basis of the actual total solids of the solution employed and derived from any one of the sources and methods hereinabove given, are mixed with 90 parts of commercial phenol which is known as "82% phenol," which contains 82% $C_6H_5OH$, the remainder consisting of cresols and high phenolic homologues and a small amount of water. To this mixture there is then added 80 parts of commercial formaldehyde solution containing 36% to 40% of actual $CH_2O$. A sufficient amount of alkaline reacting substance as a catalyst (such as ammonia, ammonium hydroxide, sodium hydroxide, or their equivalents) is employed so as to establish in the mixture a pH somewhere between 7 and 9. In actual practice, and using commercial phenol, this will require about 4 parts of sodium hydroxide.

The resultant mixture is refluxed in a suitable condensing vessel provided with a reflux condenser for a period of approximately 50 minutes to initiate the reaction, whereupon 30 parts more of formaldehyde solution are added and the refluxing continued for another 40 minutes. During the reaction period a part of the condensation product or resin precipitates out of the water solution in the form of an oily liquid. The excess water present in the condensing vessel is then removed therefrom, as for example by producing a vacuum in the vessel, causing the water to boil and leaving the resin behind. The water may be condensed, as it possibly carries out of the vessel some of the formaldehyde and possibly a slight amount of the phenol. The operation is continued until there remains in the vessel a practically water-free resinous mass which is in a viscous liquid condition. The vessel is preferably provided with powerful mixing means so that the next step in the operation can be performed without necessarily removing the resin from the vessel, although this can be done if deemed desirable. In any event, the resinous condensation product is mixed with 200 parts of wood flour or equivalent comminuted filler, care being taken to secure as thorough as possible a mixture. It is also within contemplation of the invention to add this filler before removal of the water and then to evaporate the water from the resin-filler mixture, as it has been found that such operation produces a very intimate and satisfactory final mixture. As a further alternative, the mixing may be accomplished in a ball mill or on hot mixing rolls.

After cooling, the product obtained is a molding material which is preferably, however, further comminuted, as by grinding, to produce a finely powdered material. This material forms the final product of the present invention and yields a very satisfactory, somewhat dark-colored molding powder which may be molded in accordance with the usual phenolic resin molding technique at a temperature of about 340° F. and at pressures of from 2000 to 3000 pounds per square inch, the molding period being from 1 to 10 minutes, depending upon the size and intricacy of the mold.

It might be stated that the initial condensation product or resin produced in accordance with the present invention is, in contrast to the usual phenolic aldehyde condensation products, not soluble to any great extent in organic solvents, as for example alcohol.

From the above description, it will be seen that the products obtained, while analogous to the phenolic condensation products, differ considerably therefrom; and although proteins are employed as a source of one of the ingredients, the protein degradation or cleavage products are not at all analogous to the protein glues or adhesive products previously disclosed in the patent art and literature, which contain phenol aldehyde condensation products merely as admixtures or adjuvants. The protein degradation or cleavage products used in the present invention are materials which remain substantially in aqueous solution even though the solution be maintained at a pH of as low as 4.8. The solutions of degraded proteins obtained by the present applicants can never be regenerated to their original form by treating the solution with an acid, and the degraded products contain no alkali proteinates as such. It may also be stated that the resinous product of the present invention, particularly when in the B stage and most certainly when in the C stage, is substantially insoluble in the common solvents such as alcohol, acetone, chloroform, benzene, carbon tetrachloride, etc.

The molding powder produced by the present invention flows very readily, cures rapidly, and can stand for long periods of time without losing its molding characteristics. Furthermore, the products molded therefrom are characterized by great hardness, particularly high impact resistance and remarkable water resistance.

Saving for themselves such equivalents as will occur to those skilled in the art to which this invention relates, applicants claim:

1. An artificial resin product comprising the reaction product of water-soluble slightly acid-reacting degraded protein with a phenol and an aldehyde.

2. An artificial resin product comprising the reaction product of water-soluble slightly acid-reacting degraded protein with a phenol and formaldehyde.

3. An artificial resin product comprising the reaction product of water-soluble slightly acid-reacting degraded animal protein with a phenol and an aldehyde.

4. An artificial resin product comprising the reaction product of water-soluble slightly acid-reacting degraded vegetable protein with a phenol and an aldehyde.

5. An artificial resin product comprising the reaction product of water-soluble slightly acid-reacting keratin cleavage products with a phenol and an aldehyde.

6. An artificial resin product comprising the reaction product of water-soluble slightly acid-reacting keratin cleavage products with a phenol and formaldehyde.

7. The process of producing a resinous molding powder which comprises the steps of degrading a proteid material in an aqueous medium by means of heat and pressure to form a water-soluble slightly acid-reacting protein cleavage product solution, and reacting the latter with a phenolic substance and an aldehyde.

8. The process of claim 7 in which the proteid material is a prolamin.

9. The process of claim 7 in which the proteid material is a scleroprotein.

10. The process of claim 7 in which the proteid material is keratin.

11. The process of producing a resinous molding powder which comprises the steps of mixing a protein with an excess of water and a small amount of an alkaline material, subjecting the mixture to heat and pressure sufficient to produce a soluble slightly acid-reacting protein cleavage product solution therefrom, and thereafter boiling said solution with a phenol and an aldehyde in the presence of a catalyst until a combined condensation product results, and mixing the latter with a filler.

12. The process of claim 11 wherein said catalyst comprises an alkaline reacting substance.

13. The process of claim 11 when applied to a prolamin.

14. The process of claim 11 when applied to a scleroprotein.

15. The process of claim 11 when applied to keratin.

16. The process of claim 11 when applied to corn gluten.

17. The process of claim 11 when applied to soybean protein.

18. An artificial resin product comprising the reaction product of water-soluble slightly acid-reacting degraded corn protein with a phenol and an aldehyde.

19. An artificial resin product comprising the reaction product of water-soluble slightly acid-reacting degraded soybean protein with a phenol and an aldehyde.

20. The process of producing a resinous molding powder which comprises the steps of degrading a vegetable protein material in an aqueous medium by means of heat and pressure to form a water-soluble slightly acid-reacting degraded protein solution, and reacting the latter with a phenol and an aldehyde.

21. The process of claim 20 in which the protein material is corn gluten.

22. The process of claim 20 in which the protein material is soybean protein.

23. The process of claim 20 in which the protein material contains carbohydrate.

24. The process of producing a resinous molding powder which comprises the steps of mixing a vegetable protein material with an excess of water and a small amount of an alkaline material, subjecting the mixture to heat and pressure sufficient to solubilize and degrade the protein material thereby to form a slightly acid-reacting solution thereof, and thereafter boiling said solution with a phenol and an aldehyde in the presence of a catalyst until a combined condensation product results, and mixing the latter with a filler.

25. The process of claim 24 wherein said catalyst comprises an alkaline-reacting substance.

LLOYD EMIL DIMOND.
WILLIAM LLEWELLYN HICKS.